United States Patent
Lackner

[19]

[11] Patent Number: 5,851,096
[45] Date of Patent: Dec. 22, 1998

[54] RACHETED NUT ASSEMBLY

[76] Inventor: Raymond F. Lackner, 4741 Baldwin Manor Rd., Pittsburgh, Pa. 15227

[21] Appl. No.: 847,665

[22] Filed: Apr. 22, 1997

[51] Int. Cl.$^6$ .............................. F16B 37/08; F16B 23/00
[52] U.S. Cl. .......................... 411/432; 411/435; 411/407; 411/919
[58] Field of Search .................................. 411/402, 407, 411/409, 427, 432, 435, 919

[56] References Cited

U.S. PATENT DOCUMENTS

| 8,214 | 7/1851 | St. John . |
| 91,400 | 6/1869 | Wright . |
| 533,386 | 1/1895 | Upshaw . |
| 633,880 | 9/1899 | Miller . |
| 683,167 | 9/1901 | Adams . |
| 1,255,210 | 2/1918 | Newton . |
| 1,635,102 | 7/1927 | Watson . |
| 4,820,096 | 4/1989 | Knight ..................................... 411/169 |
| 5,338,142 | 8/1994 | Gonzales .................................. 411/402 |

FOREIGN PATENT DOCUMENTS 1 428 846  10/1988  U.S.S.R. ................................. 411/432

Primary Examiner—Neill R. Wilson
Attorney, Agent, or Firm—George Raynovich, Jr., Esq.

[57] ABSTRACT

A ratcheted nut assembly is provided to enable a nut to be tightened onto a bolt in a limited area. The ratcheted nut assembly includes an internally threaded nut that has radially extending teeth on its outer surface. The nut is held rotatably captive within an elongated housing that has a generally "Y" shaped ratchet member pivoted so that the ratchet member may have pawls that are formed on it engaged with the teeth of the nut to rotate the nut. The operator positions the ratchet member into engagement with the radially extending teeth on the nut depending upon which direction the operator desires to turn the nut. The ratchet mechanism remains with the nut after the nut is tightened.

9 Claims, 2 Drawing Sheets

RACHETED NUT ASSEMBLY

BACKGROUND OF THE INVENTION

1. Field of the Invention

This invention relates to a ratcheted nut assembly for tightening a nut on a bolt in limited access areas where it is difficult to place a wrench on the nut and difficult to reach the nut. An example of such a location is to tighten the bolt holding a toilet seat to the toilet. In other applications, where it is difficult to tighten the nut on a threaded member because access is limited, the present invention is valuable.

2. Description of the Prior Art

Earlier attempts have been made to solve the problem solved by the present invention. U.S. Pat. No. 4,820,096 provides a form of wing nut that has a single wing to assist in tightening the nut. In order to tighten the nut of this patent, sufficient room is required to permit the wing attached to the nut to make a full circle. Often, this is not possible. U.S. Pat. No. 8,214; U.S. Pat. No. 91,400; U.S. Pat. No. 533,386; U.S. Pat. No. 633,880; U.S. Pat. No. 683,167; U.S. Pat. No. 1,255,210; and U.S. Pat. No. 1,635,102 are all examples of ratcheting mechanisms which have been utilized in the past to rotate rotatable units. These devices do not provide simple ratcheted nut mechanisms wherein the ratchet assembly is left with the nut after the nut has been tightened to secure a bolt.

SUMMARY OF THE INVENTION

In accordance with the present invention, there is provide a ratcheted nut assembly having an internally threaded nut that has a plurality of radially extending teeth formed on the outer circumference of the nut. An elongated housing rotatably receives a nut and supports the nut. A ratchet member is pivotally secured to the elongated housing. The ratchet member is freely pivotable relative to the housing and has two pawls that alternately cooperate with the radially extending teeth on the nut to rotate the nut. The nut may be rotated in either one of two directions so that the nut may be tightened or loosened depending upon the pivoted position of the ratchet member. The ratchet member is hand-held by the operator of the ratcheted nut assembly to the desired pivoted position relative to the housing in order to tighten or loosen the nut as the operator desires.

The ratcheted nut assembly of the present invention may be formed of all plastic parts so that the unit may be utilized in a corrosive atmosphere without corroding. As an example, if the unit of the present invention is utilized to tighten the bolt holding down a toilet seat, the nut will not corrode if it is formed of plastic material.

Accordingly, an object of the present invention is to provide an improved ratcheted nut assembly.

Another object of the present invention is to provide a ratcheted nut assembly which may be formed relatively inexpensively from plastic parts.

These and other objects of the present invention will be more completely disclosed and described in the following specification, the accompanying drawings and the appended claims.

DESCRIPTION OF THE PREFERRED EMBODIMENT

Figure 3:
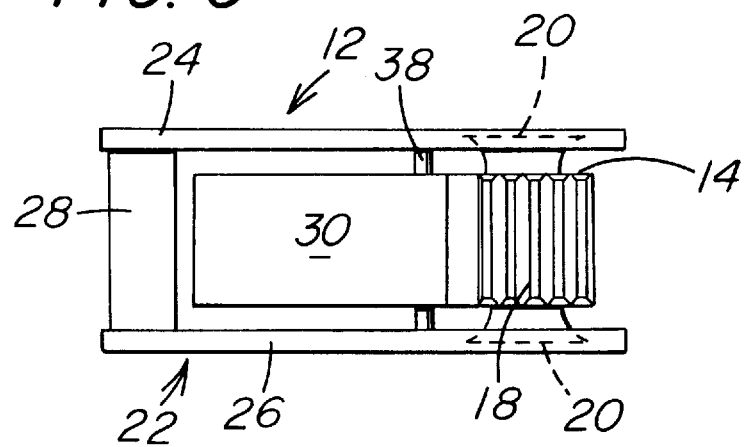
FIG. 3 is a side elevation of the assembly of FIG. 2 without the bolt showing certain details of assembly.

Referring to the drawings, there is shown a bolt 10 having a ratcheted nut assembly indicated generally at 12 threaded onto the bolt 10. The ratcheted nut assembly includes the nut 14 having internal threads 16 and radially extending teeth 18 formed on the outer surface of the nut 14. Ordinarily, there will be at least eight radially extending teeth 18 formed externally on the nut 14. The nut 14 has flanged retainers 20 (FIG. 3) for a purpose to be described.

An elongated housing indicated generally at 22 includes a top wall 24, a bottom wall 26 and a support post 28 that joins the top wall 24 to the bottom wall 26. The nut 14 is rotatively held captive between the top wall 24 and bottom wall 26 of the elongated housing 22 by the flanged retainers 20 on the nut 14 that cooperate with the top wall 24 and the bottom wall 26 to retain the nut within the elongated housing 22.

A generally "Y" shaped ratchet member 30 having a pawl 32, a pawl 34 and a bottom leg 36 is pivoted between top wall 24 and bottom wall 26 of the elongated housing 22 on a pivot pin 38. The pivot pin extends between the top wall and bottom wall of housing 22 and permits the ratchet member 30 to be pivoted so that either pawl 32 or pawl 34 can be engaged with the radially extending teeth 18 on nut 14 in order to rotate the nut 14 when the elongated housing 22 is rotated.

Figure 1:
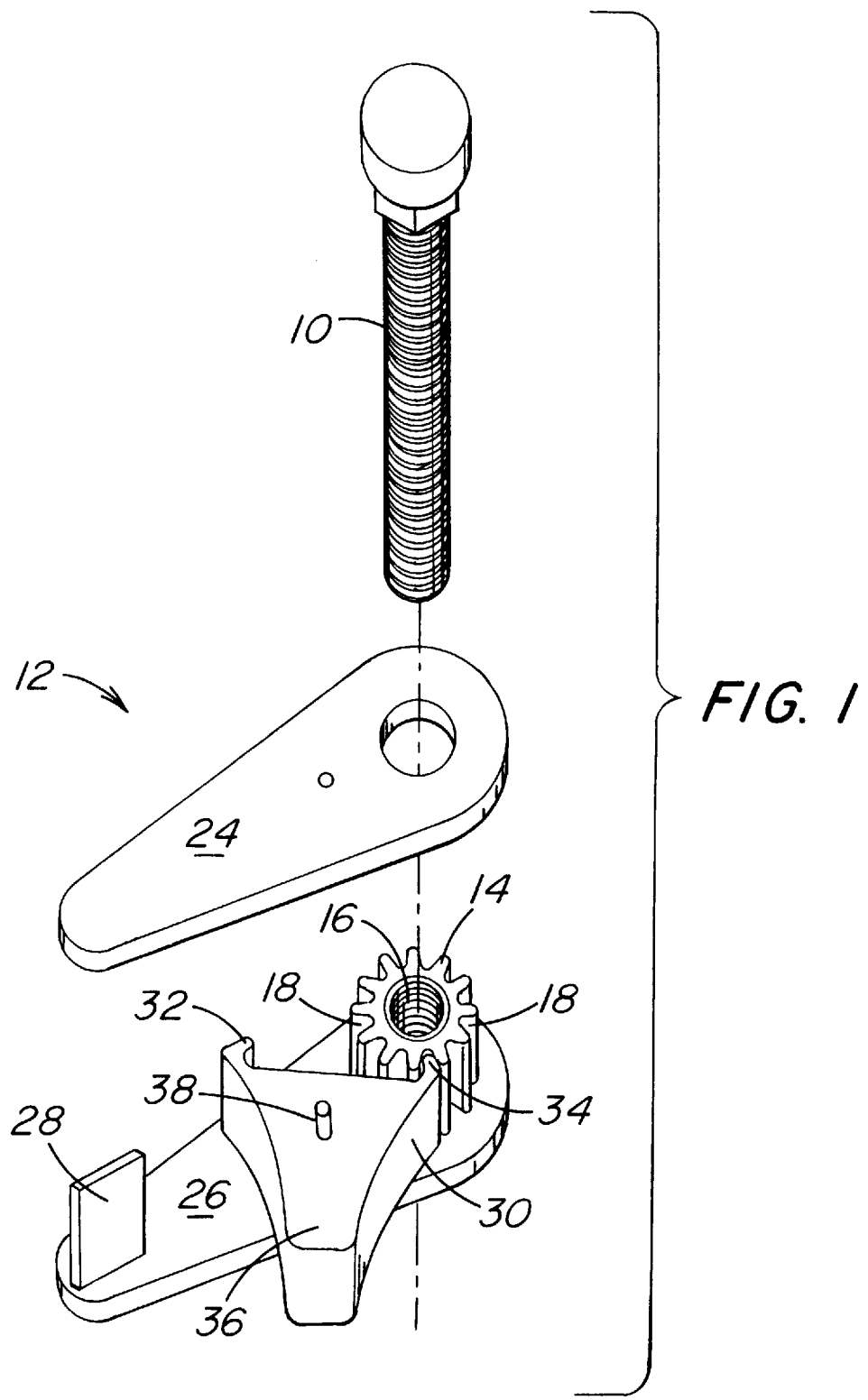
FIG. 1 is an exploded perspective view of the ratcheted nut assembly of the present invention with a bolt.
Figure 2:
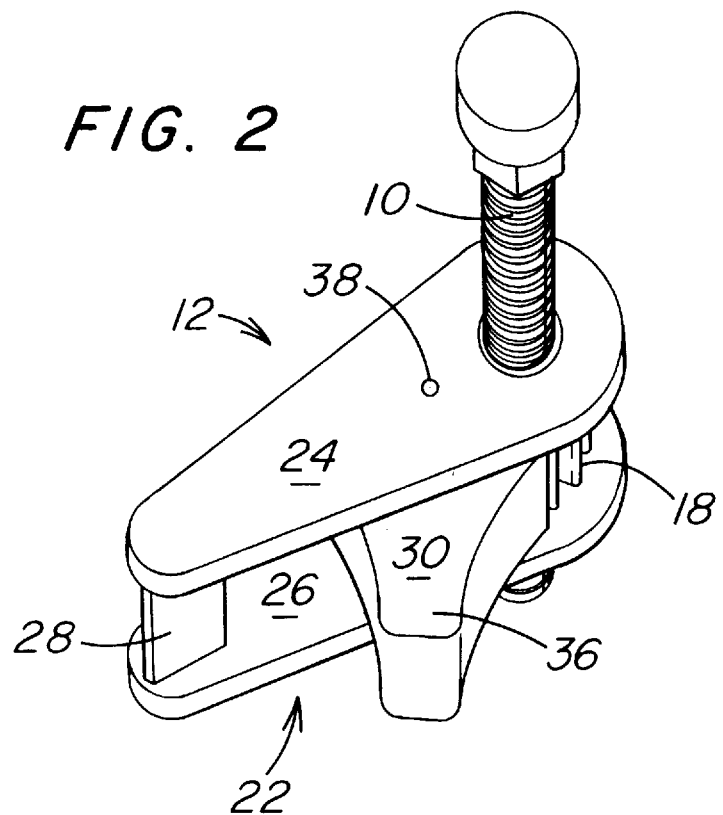
FIG. 2 is an assembled perspective view of the present invention.

In operation, in order to tighten the nut 14 onto bolt 10, the ratchet member 30 is moved to the position in FIGS. 1 and 2 so that the pawl 34 engages teeth 18 of nut 14 and bottom leg 36 extends to the side of the elongated housing 22. The ratchet member 30 is manually held in that position by the operator while the operator turns the elongated housing 22 in a counter-clockwise direction as viewed from the top of FIGS. 1 and 2. Once the elongated housing has reached the limit of its available room while being turned in a counter-clockwise direction, it is turned in the opposite direction and the pawl 34 is disengaged from the teeth 18 of nut 14. The ratchet member 30 is then pivoted back into an engagement so that pawl 34 engages teeth 18 and the elongated housing 22 is again moved in the counter-clockwise direction as viewed from the top of FIGS. 1 and 2.

If it is desired to loosen the nut on the bolt 10, the directions of rotation are reversed and the ratchet member 30 is pivoted about pivot pin 38 so that pawl 32 is engaged with the radially extending teeth 18 on nut 14. The elongated housing 22 is then rotated in a clockwise direction as viewed from the top of FIGS. 1 and 2.

The ratcheted nut assembly 12 of this invention may be formed with all plastic parts in order to eliminate corrosion of the parts. It has been found that polyethylene or nylon is a suitable material for the parts. The parts of the device may also be manufactured partly of metal and partly of plastic such that the nut 14 may be plastic and the other portions formed of metal. It will be appreciated that after the nut 14 is tightened to its final position, the elongated housing 22 and the "Y" shaped ratchet member 30 remain in place on the nut 14. If, at some later time, it is desired to remove the nut 14 from the bolt 10, the ratchet mechanism may be utilized for that purpose.

The invention has been described as being useful for tightening a toilet seat to a toilet bowl. It will be appreciated that this is one area where space is limited to position tools necessary to tighten a nut. There are many other uses for the invention as disclosed where space is limited for tightening a nut. This invention is not limited to plumbing fixtures.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. A ratcheted nut assembly comprising:

an internally threaded nut having a plurality of radially extending teeth formed on the outer circumference of said nut;

an elongated housing rotatably receiving said nut and formed from two spaced apart segments with said internally threaded nut rotatably positioned between said segments and said segments supporting said nut;

a ratchet member pivotally secured to said elongated housing, said ratchet member being freely pivotable relative to said housing and having two pawls that alternately cooperate with said radially extending teeth on said nut to rotate said nut in one of two directions whereby said nut may be tightened or loosened depending upon the pivoted position of said ratchet member;

said ratchet member being hand-held by an operator of said ratcheted nut assembly to the desired pivoted position relative to said housing to tighten or loosen said nut as the operator desires.

2. The ratchet nut assembly of claim 1 wherein all the parts of said assembly are formed of plastic material.

3. A ratcheted nut assembly comprising:

an internally threaded nut having a plurality of radially extending teeth formed on the outer circumference of said nut;

an elongated housing rotatably receiving said nut and supporting said nut;

a ratchet member pivotally secured to said elongated housing, said ratchet member being freely pivotable relative to said housing and having two pawls that alternately cooperate with said radially extending teeth on said nut to rotate said nut in one of two directions whereby said nut may be tightened or loosened depending upon the pivoted position of said ratchet member, said ratchet member being generally "Y" shaped with the bottom of said "Y" extending beyond the sides of said elongated housing when said ratchet member is positioned to move said nut in a desired direction;

said ratchet member being hand-held by an operator of said ratcheted nut assembly to the desired pivoted position relative to said housing to tighten or loosen said nut as the operator desires.

4. The ratcheted nut assembly of claim 3 wherein said internally threaded nut and said ratchet member are formed of plastic material.

5. A ratcheted nut assembly comprising:

an internally threaded nut having eight or more radially extending teeth formed on the outer circumference of said nut;

an elongated housing having top and bottom walls with said nut being rotatably positioned between said walls and held captive by said walls;

a generally "Y" shaped ratchet member pivotally secured between the walls of said elongated housing with a pawl formed on each arm of said generally "Y" shaped ratchet member and arranged so that the bottom leg of said generally "Y" shaped ratchet member extends beyond the sides of said elongated housing when one of said pawls in engaged with said radially extending teeth on said nut;

said ratchet member being freely pivotable relative to said housing so that said pawls are alternately engagable with said radially extending teeth on said nut to rotate said nut in one of two directions whereby said nut may be tightened or loosened depending upon the pivoted position of said ratchet member;

said ratchet member being hand-held by an operator of said ratcheted nut assembly to the desired pivoted position relative to said housing to tighten or loosen said nut as the operator desires.

6. The ratcheted nut assembly of claim 5 wherein all the parts of said assembly are formed of plastic material.

7. The ratcheted nut assembly of claim 5 wherein said internally threaded nut and said ratchet member are formed of plastic material.

8. The ratcheted nut assembly of claim 5 wherein said bottom leg of said generally "Y" shaped ratchet member extends beyond said elongated housing on one side when said nut is being tightened and extends beyond said elongated housing on the opposite side when said nut is being loosened.

9. The ratcheted nut assembly of claim 5 wherein said internally threaded nut has flanged retainers at each end to cooperate with said elongated body top and bottom walls to hold said nut in a rotatable captive position within said elongated body.

* * * * *